April 29, 1969     E. M. MAGEE ET AL     3,441,402
CONTINUOUS PROCESS FOR THE PRODUCTION OF MAGNESIUM
Filed Dec. 15, 1965
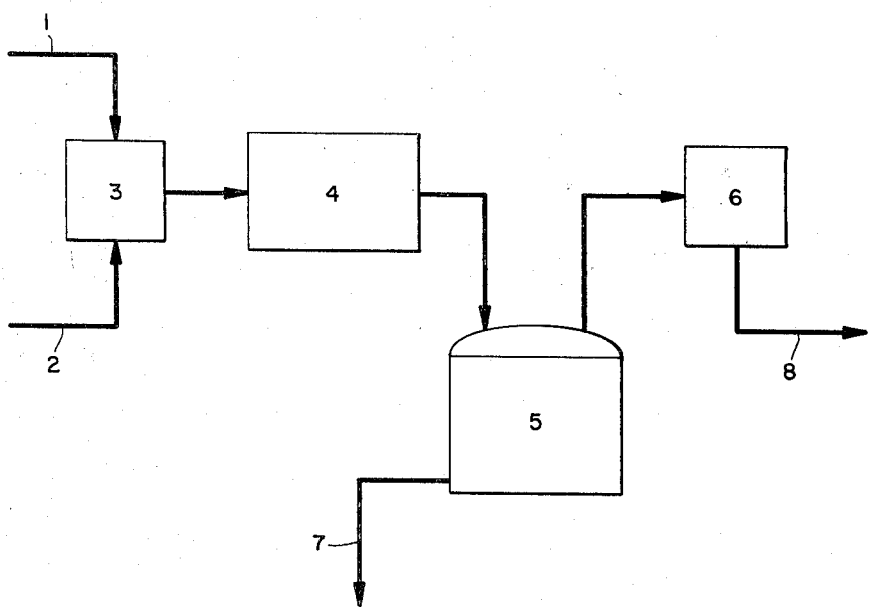
ELLINGTON M. MAGEE
BENJAMIN EISENBERG    *INVENTORS*
BY W. O. T Heilman
*PATENT ATTORNEY*

United States Patent Office 3,441,402
Patented Apr. 29, 1969

3,441,402
CONTINUOUS PROCESS FOR THE PRODUCTION OF MAGNESIUM
Ellington M. Magee, Scotch Plains, and Benjamin Eisenberg, Parsippany, N.J., assignors to Esso Research and Engineering Company, a corporation of Delaware
Filed Dec. 15, 1965, Ser. No. 513,992
Int. Cl. C22d 7/02; C22b 45/00
U.S. Cl. 75—10                          8 Claims

ABSTRACT OF THE DISCLOSURE

This invention relates to a process for the continuous production of magnesium metal, which comprises introducing a mixture of magnesium ores into a submerged arc electric furnace together with a reducing agent. The furnace temperature is maintained below about 1500° C. and operated at one atmosphere. The magnesium vapor is withdrawn from the furnace and condensed to obtain liquid magnesium. The molten slag is removed from the furnace and handled as desired.

The present invention is broadly concerned with the production of high quality magnesium. The invention is more particularly concerned with a thermal treatment of magnesium oxide utilizing a particular technique and apparatus wherein the magnesium is continuously produced by the condensation of magnesium vapor. In accordance with the present invention briquettes of aluminum-silicon alloy and a mixture of two magnesium oxide ores are continuously fed to a submerged arc furnace operating at atmospheric pressure. The liberated magnesium vapor is continuously condensed, and the oxide residues are tapped as a molten slag.

It is known in the art that present thermal methods for producing magnesium are slow batch operations wherein a high vacuum is required. These methods are not suitable for operation on a scale large enough to compete with electrolytic cell methods for the production of magnesium.

The submerged arc electric furnace is a particularly useful device for carrying out the thermal reduction of magnesium oxide, because the furnace can directly heat the reactants to a temperature high enough so that the vapor pressure of magnesium liberated in the reaction is at least one atmosphere. Such a high temperature cannot be achieved in presently available externally heated metal retorts when using any of the well known reducing agents for magnesium oxide, such as silicon, carbon, aluminum, calcium carbide, or alloys containing any of these reducing agents. However, operation at atmospheric pressure is very desirable for the continuous production of magnesium at high temperature because feeding and discharging operations are greatly simplified, because the stress on materials of construction is minimized, and because magnesium condenses as a liquid rather than as a solid, such as occurs in process requiring a high vacuum. Thus, the process described here uses a submerged arc electric furnace operating at one atmosphere as the heart of a technique for producing magnesium continuously on a large scale.

It is known that aluminum is a very effective reducing agent for magnesium oxide; it is also known that aluminum can be obtained relatively cheaply in the form of aluminum-silicon alloy, for example, by carbothermic smelting of aluminum-silicate ores. Aluminum-silicon alloy is especially advantageous for use in the operation proposed here because it will liberate magnesium vapor at one atmosphere vapor pressure at a temperature somewhat below 1500° C., which is relatively moderate for the submerged arc electric furnace. Although the process described utilizes aluminum-silicon alloy, any of the other well-known metal reducing agents for magnesium oxide, including silicon, calcium carbide, or alloys containing any of these materials may be used. However, these other reducing agents would require operating at a higher temperature in order to achieve one atmosphere magnesium vapor pressure. The choice of reducing agent will depend on an economic balance between the cost of the reducing agent and the cost associated with operating the electric furnaces at higher temperatures.

An important consideration in the operation of the submerged arc electric furnace is that the material remaining in the furnace at the completion of the reaction be molten so that it can be tapped. In the production of magnesium by electrothermic reduction of magnesium oxide ores, this can be accomplished in one of two ways. If a single magnesium oxide ore is used, such as, for example, dried brucite, calcined magnesite, dried serpentine, dried olvine, calcined dolomite, or magnesium oxide derived in some fashion from sea water or brines, the resulting slag must be tapped by operating the electric furnace at a very high temperature, generally above 1800° C. However, if the slag contains a proper ratio of

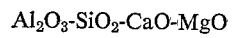
$Al_2O_3$-$SiO_2$-$CaO$-$MgO$ it will be molten at much lower temperatures. This can be accomplished by adding whichever metal oxides are deficient. A better method is to choose the magnesium oxide feed such that a slag molten at low temperature occurs without the need for adding additional metal oxides.

In accordance with the present invention it has been found that a slag molten at temperatures below 1500° C. can be achieved by using a proper mixture of two magnesium oxide ores. The use of aluminum-silicon alloy as a reducing agent gives rise to an equivalent amount of $Al_2O_3$-$SiO_2$ in the slag. There will also be present a certain amount of MgO representing a residual amount which has not been reduced to magnesium. CaO is supplied by using calcined dolomite for one of the magnesium oxide ores. The second magnesium oxide ore can be one consisting mainly of magnesium oxide, such as calcined magnesite. Or, it can be an ore consisting of a mixture of magnesium oxide and silica, such as dried serpentine.

Thus, in accordance with the present invention, magnesium is continuously produced by the use of aluminum-silicon alloy to reduce a mixture of magnesium oxide ores in a submerged arc electric furnace. The magnesium is formed as a vapor and condensed as a liquid. The calcium-magnesium-aluminum-silicate by-product is removed as a molten slag. The reaction of aluminum-silicon alloy reducing magnesium oxide can be represented by Equation 1:

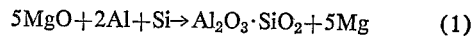
$$5MgO + 2Al + Si \rightarrow Al_2O_3 \cdot SiO_2 + 5Mg \qquad (1)$$

Equation 1 can be further expanded to include the effects of other oxides in the oxide feed and to relate the residual magnesium oxide to the utilization of aluminum-silicon alloy:

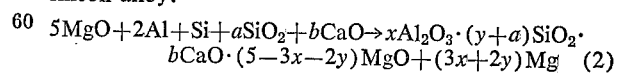
$$5MgO + 2Al + Si + aSiO_2 + bCaO \rightarrow xAl_2O_3 \cdot (y+a)SiO_2 \cdot$$
$$bCaO \cdot (5-3x-2y)MgO + (3x+2y)Mg \qquad (2)$$

Equation 2 includes silica and calcium oxide occurring in magnesium oxide ores as quantities $a$ and $b$ respectively. Quantities $x$ and $y$ represent, respectively, the fractional utilization of aluminum and silicon. Although Equation 2 is written for an aluminum-silicon alloy of 2/1 Al/Si molar ratio, it is to be understood that any molar ratio could be used, the choice depending on economic considerations, and that the present invention is not restricted to any particular Al/Si ratio. Equation 2 indicates how two magnesium oxide ores can be blended, thereby affecting quantities $a$ and $b$, to change the $Al_2O_3$-$SiO_2$-$CaO$-$MgO$ slag composition so as to achieve a slag molten at a relatively low temperature.

In particular, two embodiments of this ore blending technique are particularly advantageous. First, a mixture of calcined dolomite (theoretical formula $CaO·MgO$) and calcined magnesite (theroretical formula $MgO$) in a weight ratio of 2.42/1.00 results in a slag which is molten at 1450° C. at 90% completion of the reaction. This corresponds to quantities in Equation 2 having the following values: $a=0.0$, $b=2.52$, $x=0.90$, $y=0.90$. Second, a mixture of calcined dolomite and dried serpentine (theoretical formula $3MgO·2SiO_2$) in a weight ratio of 1.14/1.00 results in a slag which is molten at 1400° C. at 90% completion of the reaction. This corresponds to quantities in Equation 2 having the following values: $a=2.0$, $b=2.86$, $x=0.90$, $y=0.90$. It should be understood that the above numbers represent only specific examples and that the calcined dolomite/calcined magnesite ratio or the calcined dolomite/dried serpentine ratio can vary somewhat and still result in a slag molten below 1500° C. However, it is essential that a blend of two ores be used to avoid an excessively high temperature for a molten slag.

The process of the present invention may be more readily understood by reference to the drawing illustrating one adaptation of the same. A calcined mixture of two magnesium oxide ores, such as dolomite (theoretical formula $CaCO_3·MgCO_3$) and serpentine (theoretical formula $3MgO·2SiO_2·2H_2O$) or dolomite and magnesite (theoretical formula $MgCO_3$) is introduced into zone 3 by means of line 1. An aluminum-silicon alloy (30–100% Al/0–70% Si by wt. but preferably about 66% Al/34% Si by wt.) is introduced into mixing zone 3 by means of line 2. This mixture is formed into briquettes in zone 4. The briquettes are withdrawn from zone 4 and pass continuously to a submerged arc electric furnace 5 wherein the temperature in the slag zone is maintained in the range from about 1400° C. to 1800° C., preferably about 1500° C. The top of this furnace is enclosed with a suitable refractor-lined cover as, for example, magnesium oxide blocks.

The magnesium vapor formed by reaction of the briquettes in the arc furnace rises through the bed of briquettes and passes into magnesium condensing zone 6 which is maintained at a temperature in the range from about 650° C. to 1110° C., preferably about 675° C. Liquid magnesium is withdrawn from zone 6 by means of line 8 and thereafter handled as desired. Molten slag is removed from arc furnace zone 5 continuously by means of line 7 and also handled as desired.

In order to further illustrate the invention the following example is given.

EXAMPLE 1

Two operations which result in 90% yield by weight of magnesium metal are illustrated as follows:

TABLE I

[Basis: 1.0 lb. magnesium metal recovered]

| | Operation 1 | Operation 2 |
|---|---|---|
| Feed: | | |
| Aluminum-silicon alloy (66/34 by wt.) (lb.) | 0.76 | 0.76 |
| Calcined dolomite (CaO.MgO) (lb.) | 2.23 | 2.16 |
| Calcined magnesite (MgO) (lb.) | 0.92 | |
| Calcined serpentine (3MgO.2SiO₂) (lb.) | | 1.89 |
| Product: | | |
| Magnesium metal (lb.) | 1.0 | 1.0 |
| Slag | | |
| Composition (ex metal): | | |
| Al₂O₃ (percent by wt.) | 30.0 | 22.7 |
| SiO₂ (percent by wt.) | 17.7 | 38.6 |
| CaO (percent by wt.) | 45.8 | 33.8 |
| MgO₂ (percent by wt.) | 6.5 | 4.9 |
| Temperature for molten slag (° C.) | 1,450 | 1,400 |

Operation 1 uses a mixture of calcined dolomite (theoretical formula $CaO·MgO$) and calcined magnesite theoretical formula $MgO$) in a weight ratio of 2.42/1.00, resulting in a slag which is molten at 1450° C. when 90% of the magnesium oxide has reacted. Operation 2 uses a mixture of calcined dolomite and dried serpentine (theoretical formula $3MgO·2SiO_2$) in a weight ratio of 1.14/1.00, resulting in a slag which is melted at 1400° C. when 90% of the magnesium oxide has reacted. The above two cases are only examples, and the ratio and exact composition of the ores and of the aluminum-silicon alloy may vary somewhat and still result in a slag molten below 1500° C. The presence of impurities in the ore, in particular oxides of iron and other metals, will not adversely affect the slag temperature or the magnesium purity.

EXAMPLE 2

Another operation is carried out using a mixture of dolomite and serpentine in conjunction with an aluminum-silicon alloy. The analysis of the dolomite and the serpentine and the respective amounts used are shown as follows:

TABLE II

| | Wt. percent | |
|---|---|---|
| | Dolomite | Serpentine |
| SiO₂ | 6.27 | 47.1 |
| MgO | 37.6 | 44.7 |
| CaO | 53.9 | |
| R₂O₃ [1] | 1.61 | 8.5 |
| | 99.38 | 100.3 |

[1] Other minerals.

| | Weight percent |
|---|---|
| Al-Si alloy | 15.2 |
| Dolomite | 49.8 |
| Serpentine | 35.0 |
| | 100.0 |

Magnesium is produced as described and the resulting slag has a melting point below about 1450° C.

What is claimed is:

1. Process for the production of magnesium metal which comprises introducing a mixture of magnesium ores into a submerged arc furnace together with a reducing agent wherein said mixture is calcined dolomite with a second magnesium ore selected from the class consisting of calcined magnesite and dried serpentine, maintaining the temperature in said furnace below about 1500° C. and at a pressure of about on atmospheric pressure, withdrawing magnesium vapor from said furnace and condensing the same to secure liquid magnesium, and withdrawing a molten slag from said furnace.

2. Process as defined by claim 1 wherein said mixture of magnesium ores comprises essentially calcined dolomite and said second ore comprises essentially calcined dolomite and said second ore comprises essentially calcined magnesite wherein the ratio of calcined dolomite to calcined magnesite present is about 2.4 to 1.

3. Process as defined by claim 1 wherein said second magnesium ore comprises magnesite and wherein said reducing agent comprises an aluminum-silicon alloy.

4. Process as defined by claim 1 wherein said second magnesium ore comprises serpentine and wherein said reducing agent comprises an aluminum-silicon alloy.

5. Process as defined by claim 1 wherein the temperature of said furnace is maintained below about 1450° C.

6. Process as defined by claim 1 wherein the dolomite is present in about one to three parts by weight per one part by weight of a second magnesium ore.

7. Process as defined by claim 1 wherein said mixture of magnesium ore comprises dolomite having a composition of about 6% by weight of silica, about 37% by weight of magnesium oxide, about 54% by weight of calcium oxide, and serpentine having a composition of about 47% by weight of silica, about 44% by weight of magnesium oxide and wherein said reducing agent used with said ore mixture is about 15% by weight.

8. Process as defined by claim 7 wherein the amount of dolomite present is about 50% by weight and the amount of serpentine is about 35% by weight.

References Cited
UNITED STATES PATENTS

| | | | |
|---|---|---|---|
| 2,847,295 | 8/1958 | Bretschneider et al. | 75—67 X |
| 2,920,951 | 1/1960 | Bretschneider et al. | 75—66 X |
| 3,114,627 | 12/1963 | Aoyoma | 75—67 |
| 3,129,094 | 4/1964 | Munekata et al. | 75—67 |
| 3,264,097 | 8/1966 | Weiss | 75—10 X |
| 3,375,101 | 3/1968 | Mulcihy | 75—67 |
| 2,724,644 | 11/1955 | Matthieu | 75—88 XR |
| 3,151,977 | 10/1964 | Ritter et al. | 75—67 |
| 3,215,522 | 11/1965 | Kuhlmann | 75—10 |

L. DEWAYNE RUTLEDGE, *Primary Examiner.*

J. E. LEGRU, *Assistant Examiner.*

U.S. Cl. X.R.

13—34; 75—67